United States Patent
Bietry

[19]
[11] Patent Number: 6,069,748
[45] Date of Patent: May 30, 2000

[54] LASER LINE GENERATOR SYSTEM

[75] Inventor: Joseph R. Bietry, Rochester, N.Y.

[73] Assignee: Eastman Kodak Company, Rochester, N.Y.

[21] Appl. No.: 09/175,861

[22] Filed: Oct. 20, 1998

[51] Int. Cl.[7] .............................. G02B 3/02; G02B 3/06
[52] U.S. Cl. ............................................ 359/719; 359/710
[58] Field of Search .................................. 359/642, 710, 359/668, 719; 372/40, 101

[56] References Cited

U.S. PATENT DOCUMENTS

| | | | |
|---|---|---|---|
| 4,321,551 | 3/1982 | Bleil et al. | 359/349 |
| 5,283,694 | 2/1994 | Frady | 359/719 |
| 5,499,262 | 3/1996 | Nakata | 372/108 |
| 5,570,232 | 10/1996 | Yoshikawa et al. | 359/668 |
| 5,629,808 | 5/1997 | Powell | 359/719 |

*Primary Examiner*—Ricky Mack
*Attorney, Agent, or Firm*—Svetlana Z. Short

[57] ABSTRACT

According to one aspect of the present invention, a laser line generator system comprises a laser source providing a diverging laser beam and a single lens element intersecting the diverging laser beam. The single lens element has a negative optical power in one cross section and a positive optical power in another cross section. This single lens element shapes the diverging laser beam to provide a laser line at an object surface. According to a second aspect of the present invention, the lens element has a first surface that is adjacent to the laser diode. This first surface is a toroidal surface. According to one preferred embodiment of the present invention, the first surface is concave about a center of curvature in at least one cross section and, in this cross section the laser diode is located at the center of curvature. According to another aspect of the present invention, a laser line generator system includes a laser source providing a diverging laser beam and a single lens element intersecting the diverging laser beam. The single lens element has a first surface with positive optical power in at least one cross section and a second surface with optical power only in one direction. This first surface is adjacent to the laser source.

22 Claims, 6 Drawing Sheets

6,069,748

LASER LINE GENERATOR SYSTEM

FIELD OF THE INVENTION

The present invention relates to laser line generators to specifically to optical systems for generating laser lines.

BACKGROUND OF THE INVENTION

Laser lines (i.e., thin lines of laser light), are often used in the construction industry. Laser lines can mark where a saw will make its cut on a part so the part can be properly aligned to the saw. Also, horizontal level lines are used as an indicator to show when the correct height is achieved in the building of a foundation, wall or ceiling. Such horizontal level lines can also be formed by laser lines.

A laser line can be created by using either moving or non-moving components. A moving component, for example, a rotating polygon mirror, can scan a laser beam along a line. However, because it is expensive to use moving components, low cost laser line generator systems typically use non-moving components and, thus, do not scan a laser spot over a surface to form what is perceived as an image of a line. In a laser line generator system with non-moving components laser light forming the laser line results from light which is being emitted substantially simultaneously from a laser.

In a laser line generator system with non-moving components a laser line is often generated by introducing a cylindrical lens in the path of a collimated laser beam causing the beam to spread in the direction of the cylinder power and thus producing a line of light. A cylindrical lens is a lens with an optical power in one plane and no optical power in another plane. This approach works well when used with gas tube lasers because the output of a gas tube laser is collimated.

Laser diodes are much less costly and more rugged than gas tube lasers and because of this they are often used in the construction industry. Producing the same result with a laser diode, however, is a more difficult task because the output of a laser diode is not collimated. Instead, the laser beam provided by the laser diode diverges quite rapidly and the amount of divergences differ in two orthogonal directions. Thus, typical laser line generator systems use a laser diode 1 and two optical components—a collimator lens element 3 and an additional cylindrical lens element 5. (A cylindrical lens element has optical power in only one direction). Such a laser line generator system is illustrated in FIG. 1. The collimator lens 3 is placed in front of the laser diode 1 to first collimate the diverging laser beam emitted by the laser diode 1, producing a collimated beam of a small cross section. The cylindrical lens 5 then collects the collimated laser beam from the collimator lens 3 and diverges the collected light in one direction, forming a laser line 7. Because prior art laser line generator systems require two optical components in addition to a laser diode, such laser line generator systems are relatively bulky. In addition, manufacture and assembly of two optical components comprising the laser line generator system is relatively expensive.

SUMMARY OF THE INVENTION

It is an object of the present invention to provide a laser line generator system that overcomes the problems of the prior art laser line generator systems. It is further the object of this invention to provide a compact laser line generator system with fewer lens elements.

It is an advantage of the present invention that a single lens element controls the divergence of a diverging laser and creates a laser line at a target surface.

Briefly summarized, according to one aspect of the present invention, a laser line generator system comprises a laser source providing a diverging laser beam and a single lens element intersecting the diverging laser beam. The single lens element has a negative optical power in one cross section and a positive optical power in another cross section. This single lens element shapes the diverging laser beam to provide a laser line at an object surface.

According to a second aspect of the present invention, the lens element has a first surface that is adjacent to the laser diode. This first surface is a toroidal surface. According to one preferred embodiment of the present invention, the first surface is concave about a center of curvature in at least one cross section and, in this cross section the laser diode is located at the center of curvature.

According to another aspect of the present invention, a laser line generator system includes a laser source providing a diverging laser beam and a single lens element intersecting the diverging laser beam. The single lens element has a first surface with positive optical power in at least one cross section and a second surface with optical power only in one direction. This first surface is adjacent to the laser source.

According to yet another aspect of the present invention, a lens element includes a first optical surface and a second optical surface located opposite of the first optical surface. The first surface and the second surface, in combination, provide the lens element with different amounts of optical power in two orthogonal directions. The first surface is concave in one cross section and convex in a perpendicular cross section;

The above, and other objects, advantages and novel features of the present invention will become more apparent from the accompanying detailed description thereof when considered in conjunction with the following drawings.

DETAILED DESCRIPTION OF THE INVENTION

The present description will be directed in particular to elements forming part of, or in cooperation more directly with, the apparatus in accordance with the present invention.

It is understood that elements not specifically shown or described may take various forms well known to those skilled in the art.

According to one aspect of the present invention, in a laser line generator system 9, a single lens element 10 combines the functions of the collimator and the cylindrical lens. Such lens elements 10 are shown in FIGS. 2A, 2B, 2C, 3, 4 and 6–8. The specific parameters of these lens elements are provided in Tables 1–4.

Figure 2A:
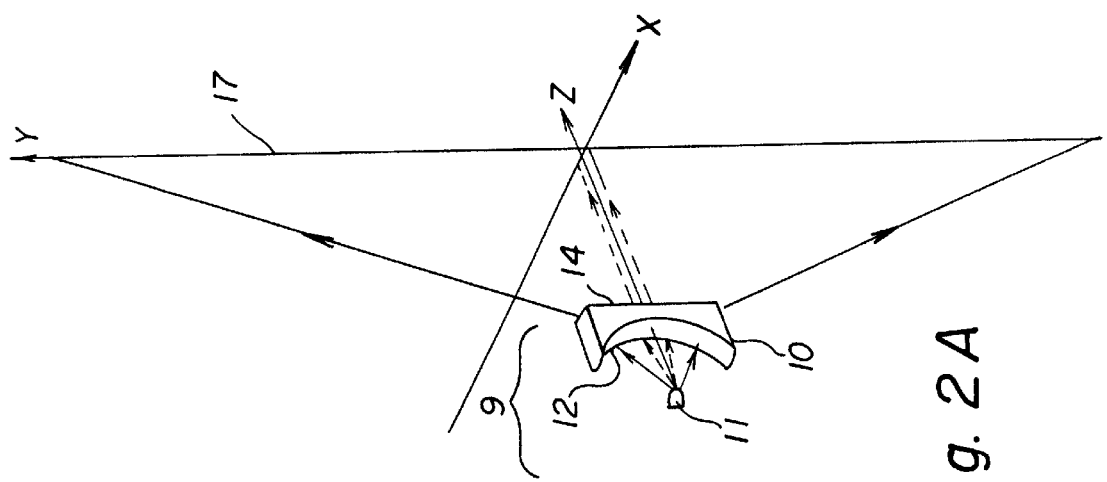
FIG. 2A is a perspective view of a laser line generator system of the first embodiment of the present invention. This laser line generator system includes a single lens element that provides a divergent laser beam in one cross section and a collimated laser beam in a perpendicular cross section.
Figure 1:
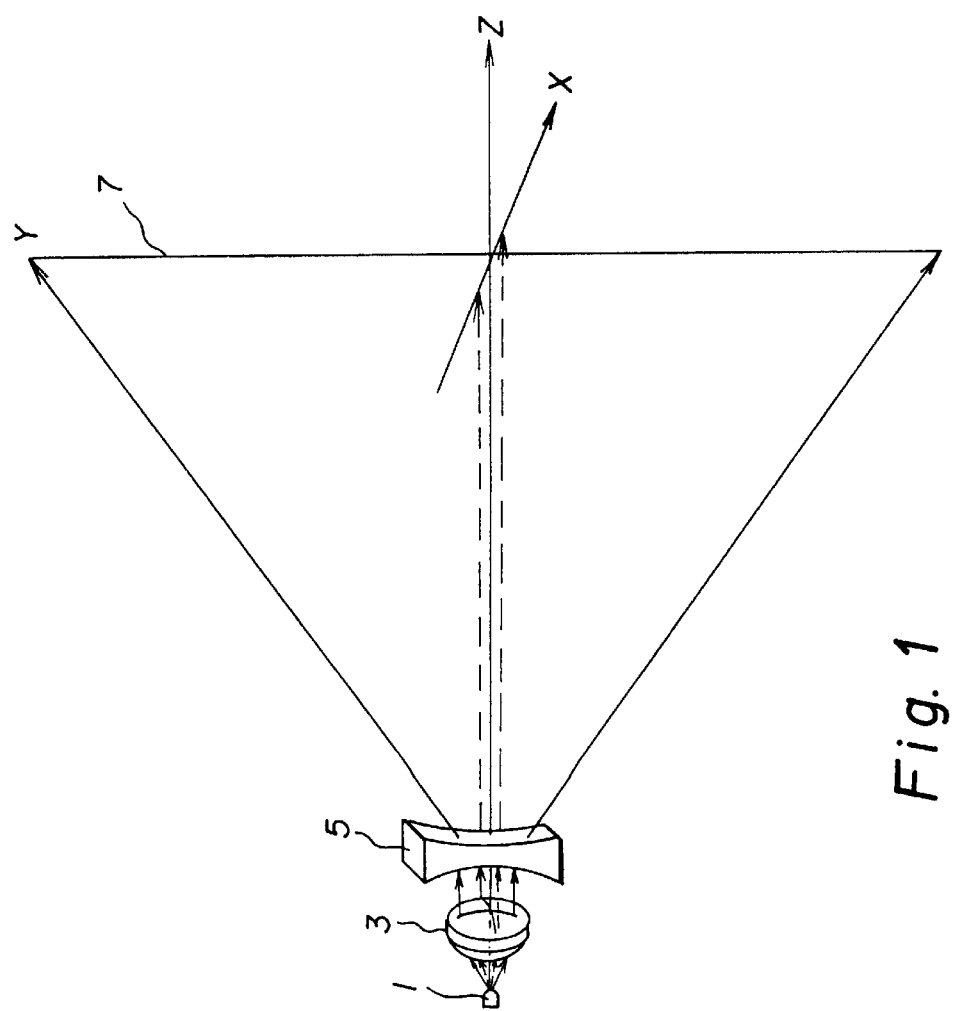
FIG. 1 illustrates a prior art laser line generator system.
Figure 2C:
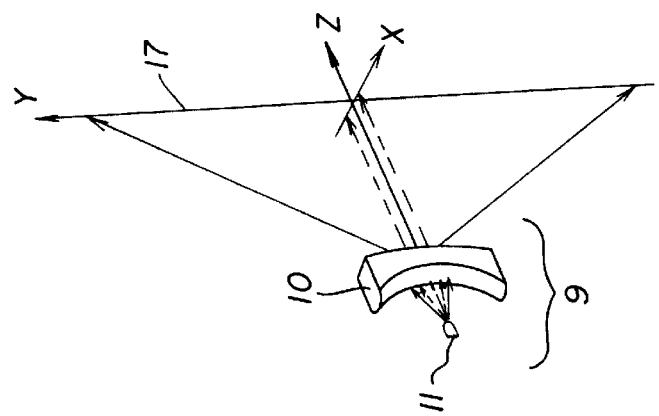
FIG. 2B and 2C are perspective views of exemplary laser line generator systems that each include a single lens element with a first, toroidal surface and a second, cylindrical surface.
Figure 2B:
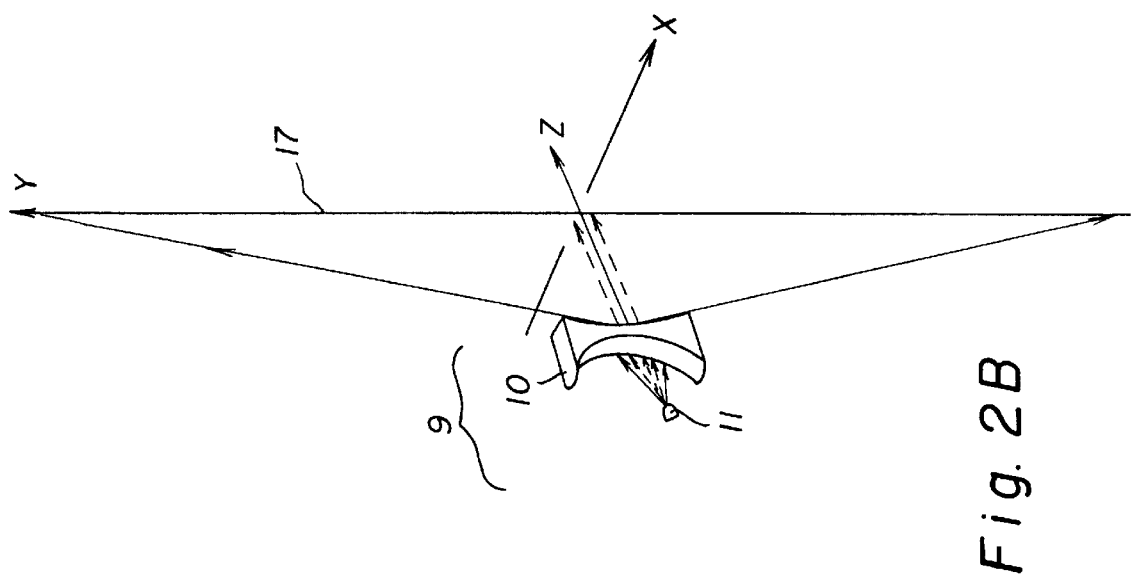
Figure 4:
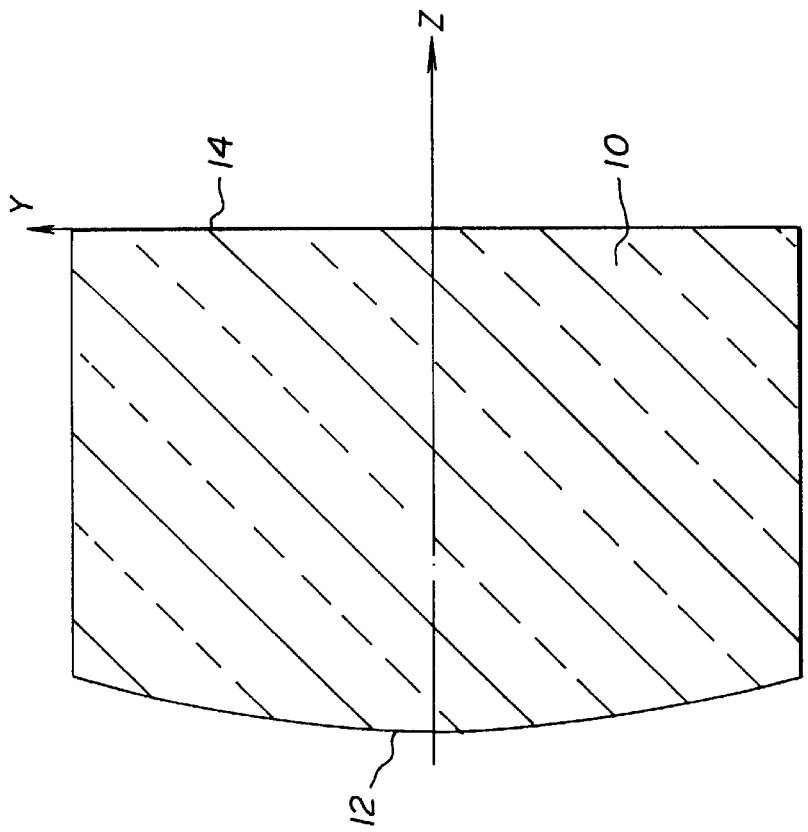
FIG. 4 is another cross sectional view of the lens element of the laser line generator system of FIG. 2A.
Figure 3:
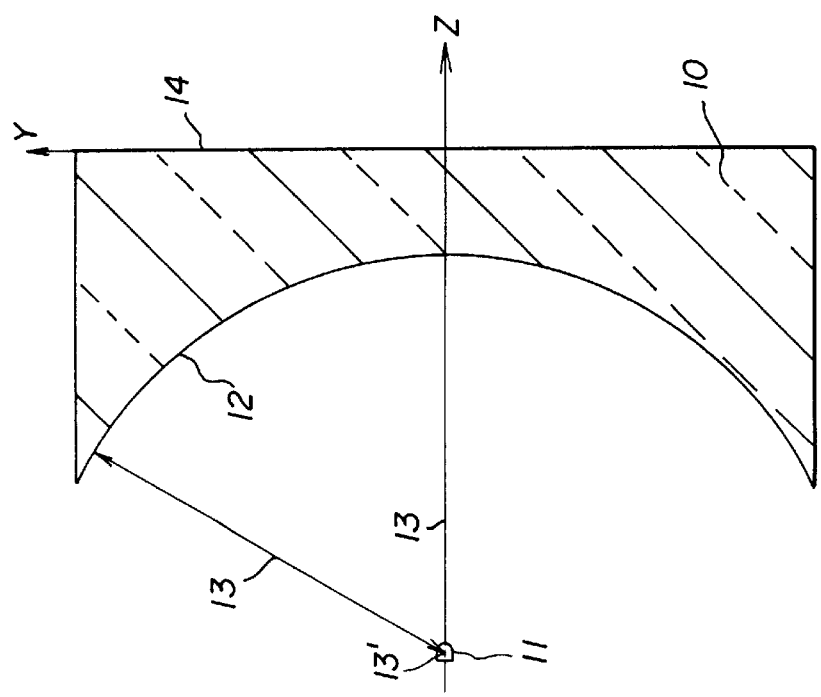
FIG. 3 is a cross sectional view of the lens element of the laser line generator system of FIG. 2A.

According to the first and preferred embodiment of the present invention, a single lens element 10 utilizes, in one direction, the natural divergence of the laser beam from a laser diode 11 to produce a laser line. In this direction, the lens element 10 may have either negative, zero, or positive power in order to alter the angular spread of the laser line. In the other (perpendicular) direction, positive optical power is introduced in order to collimate the diverging laser beam exiting the laser diode 11 so as to produce a well defined line of a predetermined thickness at any image distance. More specifically, a first surface 12 of the lens element 10 of the first embodiment of the present invention is a toroidal surface. (See FIG. 2A, 2B, 2C). The second surface 14 of this lens element 10 may be a plano surface (i.e., a surface without optical power, as shown in FIG. 2A) or a cylindrical surface with additional optical power, which can be either negative (see FIG. 2B) or positive (see FIG. 2C). A second surface with a negative optical power would increase the divergence of the laser beam. A second surface with a positive optical power would reduce the divergence of the laser beam. In the first embodiment of the present invention, shown in FIG. 2A, this second surface 14 is a piano surface (i.e., a surface without optical power) and the lens element 10 is made of glass. A more detailed description of the laser line generator system of the first embodiment of the present invention is provided below.

Laser diodes provide laser beams that have different angular divergences in the two orthogonal directions. The term "fast divergence direction" stands for the direction with the largest angular beam divergence. The term "slow divergence direction" stands for the direction with the smallest angular beam divergence.

As stated above, FIG. 2A illustrates the single lens element 10 with the toroidal first surface 12. In the Y-Z cross section, the lens element 10 has negative optical power and the first surface 12 is concave in this cross section (see FIG. 3). In the Y-Z plane this first surface 12 of the lens element 10 has a circular or nearly circular cross section with a radius of curvature 13. More specifically, it is preferred that the laser diode 11 is positioned at the center 13' of the radius of curvature of this surface 12. (See FIG. 3). This will ensure that in the Y-Z cross section the distance traveled by the laser light rays from the laser diode 11 to the first surface 12 will be the same for all emitting angles. The negative power of the combined surfaces 12 and 14 increases the natural divergence of the laser beam emitted by the laser diode to create a wider angular spread in the laser line direction. (See FIG. 2A.) The fast divergence direction of the laser beam emitted by the laser diode 11 corresponds to the Y-Z plane.

In the X-Z cross section the first surface 12 of the lens element 10 of the first embodiment has positive optical power. (See FIG. 4.) This positive optical power is used to collimate the laser light in the slow divergence direction. The first surface 12 of the lens element 10 in this cross section (X-Z) may have a circular cross section, or in order to improve the quality of collimation, an aspheric profile may be used as well. In the first embodiment of the present invention, surface 12 of the lens element 10 has an aspheric X-Z cross section.

As stated above, it is preferable that in the Y-Z plane, the laser diode to be positioned at the center 13' of the radius of curvature of the surface 12. This position ensures that the center symmetry of the first surface 12 in the Y-Z plane will be essentially equidistant for all laser light divergence angles. This will produce a proper amount of refraction in the X-Z plane and a consistent collimation output across the entire line in the X-Z plane. If this were not done, the size and collimation quality of the laser line in the X-Z plane would vary with angle of incidence of the laser light onto the first surface 12.

Figure 5:
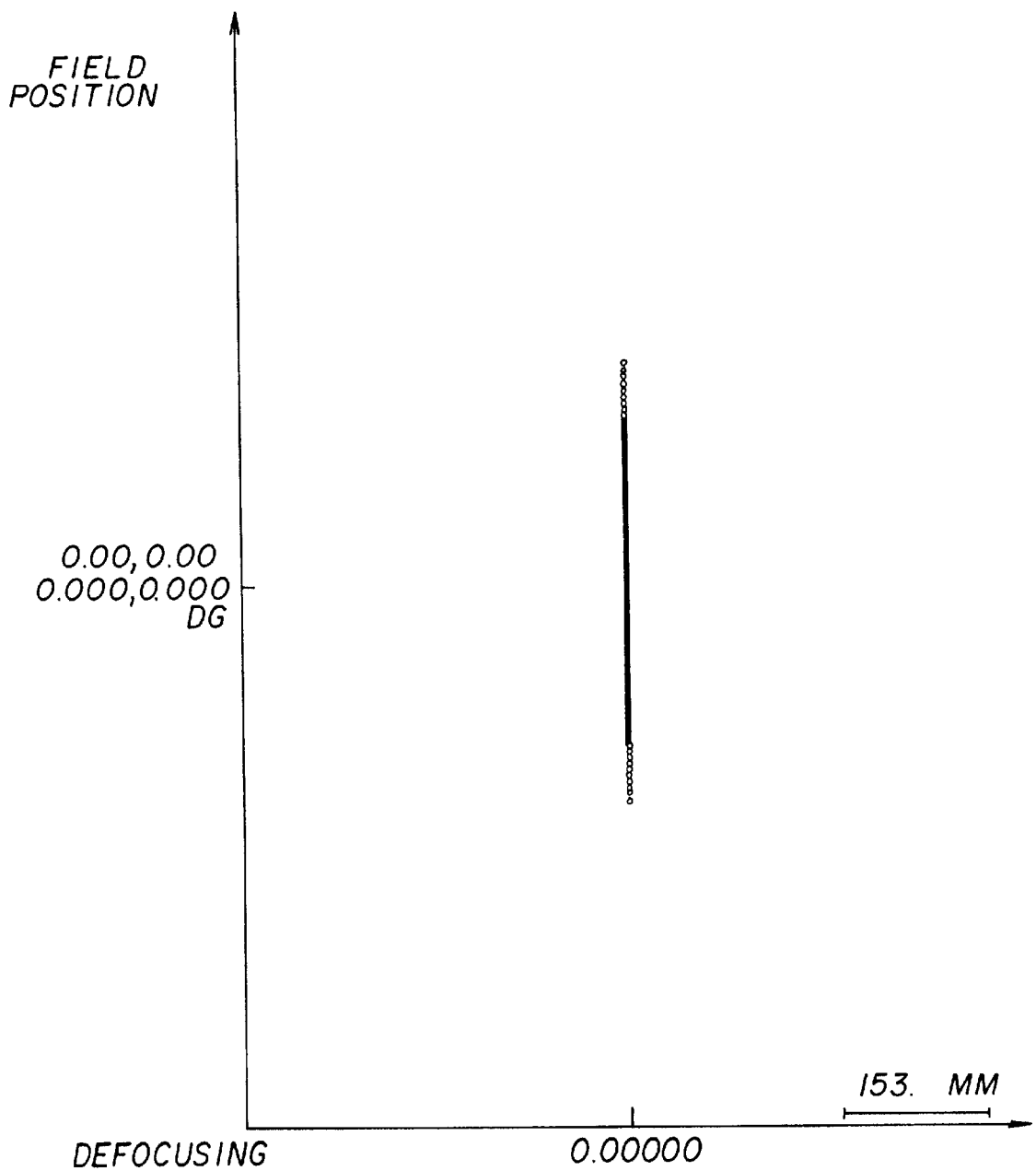
FIG. 5 is a spot diagram showing the dimensions of a laser line produced by the laser line generator system of FIG. 2A.

Thus, according to this embodiment, a laser line generator system utilizes a laser diode as the laser light source and a single lens element with a single toroidal surface to produce a high quality laser line. The optical performance of this laser line generator system can be seen in a spot diagram provided in FIG. 5. It is noted that although the width of the laser line 17 does not change, there is an intensity drop-off towards the edges of the laser line. This intensity drop is due to spherical aberration and a cosine factor fall-off of the laser line generator system, both of which can be corrected by aspherising the second surface 14 of the lens element 10. However, the intensity drop-off is generally not problem in a construction industry.

The specific parameters of the lens element 10 of the first embodiment of the present invention (shown in FIG. 2A) are provided in Table 1. It is noted that in this and other Tables, the term "RDX" stands for the radius of curvature of an optical surface in the X-Z plane, the term "RDY" stands for the radius of curvature in the Y-Z plane, "K" is the conic constant corresponding to a surface with a preceding radius of curvature; "NAO" stands for the numerical aperture at the object side, "FNO" is the f-number of the lens system, "EFL" is the effective focal length of the lens element, the term "BFL" stands for the back focus distance, the term "FFL" stands for the front focal length, and the terms "DIM". "MM", and "WL" stand for dimensions, millimeters and wavelength, respectively. The wavelength is measured in nanometers.

TABLE 1

| Surface | Radius | | Thickness | Material |
|---|---|---|---|---|
| OBJ | Infinity | | 3.300 | |
| 1 | RDY = −3.30000 | | 1.000 | SF5 Schott |
| | RDX = 2.20138 | | | |
| | K = −2.779168 | | | |
| 2, STOP | Infinity | | 10.000 | Air |

| Specification Data | | Infinite Conjugates | | At Used Conjugates | |
|---|---|---|---|---|---|
| NAO | 0.40354 | EFL | −4.9469 | FNO | −0.7432 |
| DIM | MM | BFL | −15.5468 | OBJ DIS | 3.3000 |
| WL | 650.00 | FFL | 4.9469 | | |
| | | FNO | −1.4623 | | |

| Pupil | Diameter | Thickness |
|---|---|---|
| Entrance | 3.3829 | 0.05350 |
| Exit | 3.7930 | −10.0000 |

Figure 6:
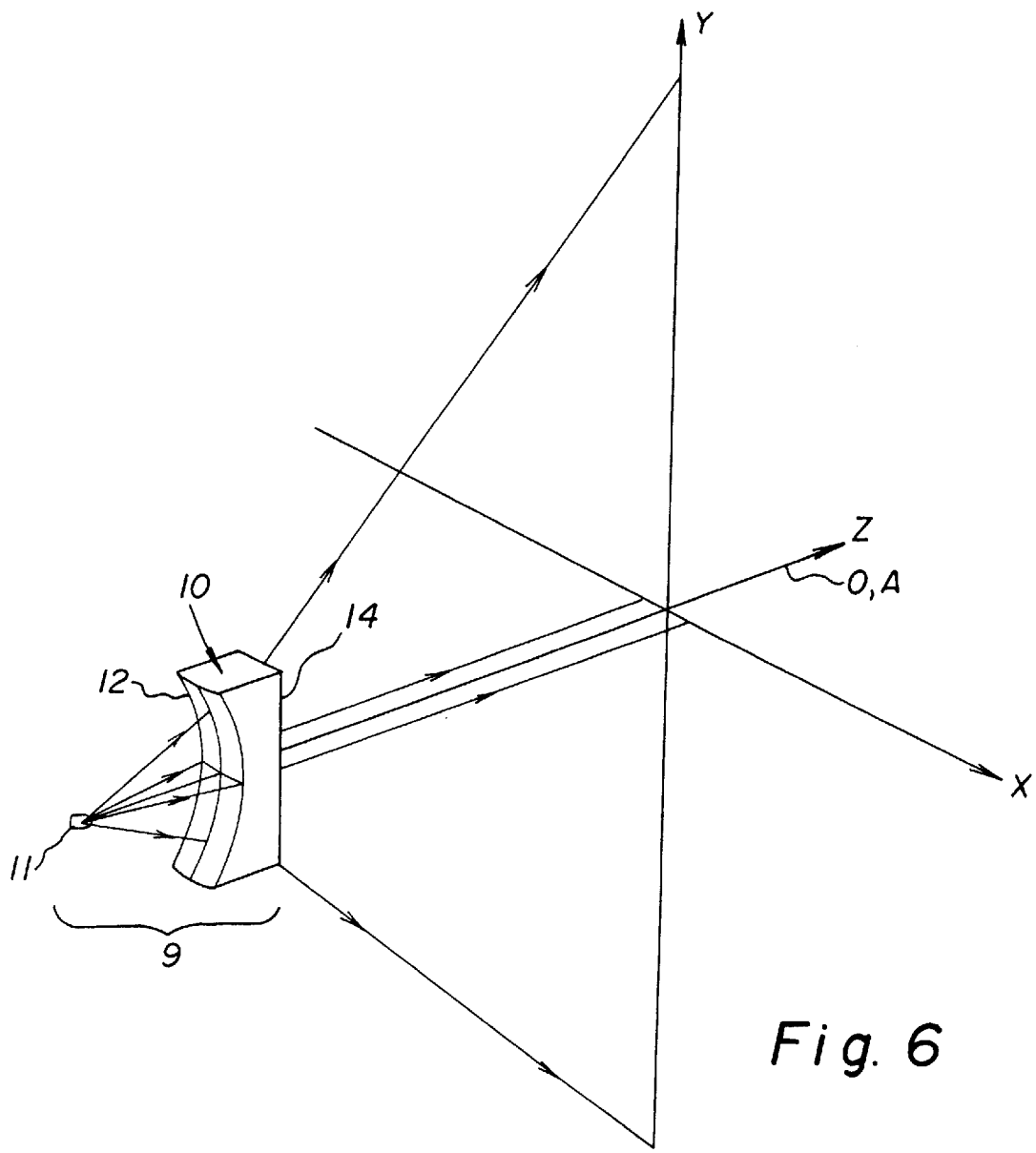
FIG. 6 is a perspective view of a laser line generator system of a second embodiment of the present invention.

FIG. 6 illustrates the lens element 10 according to the second, preferred, embodiment of the present invention. This lens element is very similar to the lens element of the first embodiment shown in FIG. 2A, but is made of plastic material. The specific parameters of the lens element 10 of the second embodiments are provided in Table 2.

TABLE 2

| Surface | Radius | Thickness | Material |
|---|---|---|---|
| OBJ | Infinity | 3.7892 | |
| 1 | RDY = −3.78917 | 1.0000 | Lexan |
| | RDX = 2.20138 | | |
| | K = 2.499420 | | |
| 2, STOP | Infinity | 10.0000 | Air |

| Specification Data | | Infinite Conjugates | | At Used Conjugates | |
|---|---|---|---|---|---|
| NAO | 0.40354 | EFL | −6.5222 | | |
| DIM | MM | BFL | −17.1547 | FNO | −0.7837 |
| WL | 650.00 | FFL | 6.5222 | OBJ DIS | 3.7892 |
| | | FNO | −1.6936 | | |

| Pupil | Diameter | Thickness |
|---|---|---|
| Entrance | 3.8511 | 0.5766 |
| Exit | 4.2245 | −10.0000 |

| Refractive Indices | |
|---|---|
| Lexan | 1.580966 |

It is noted, that in both the first and the second embodiment of the present invention, the laser diode 11 provides a laser beam that diverges by different amounts in two orthogonal cross sections and, the single lens element 10 is oriented such that the positive optical power corresponds to a smaller laser beam divergence cross section and the negative optical power corresponds to a larger beam divergence cross section. It is also noted that the lens element 10 does not have a circular clear aperture and is much larger in the cross-section that contributes negative optical power than in the cross-section that contributes positive optical power.

Figure 8:
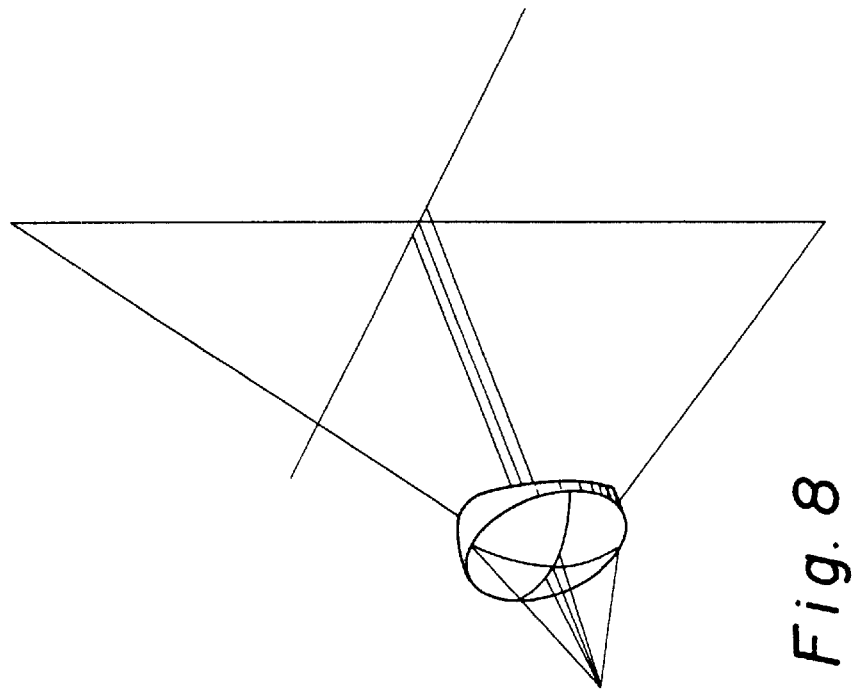
FIG. 8 is a perspective view of a laser line generator system of a fourth embodiment of the present invention.
Figure 7:
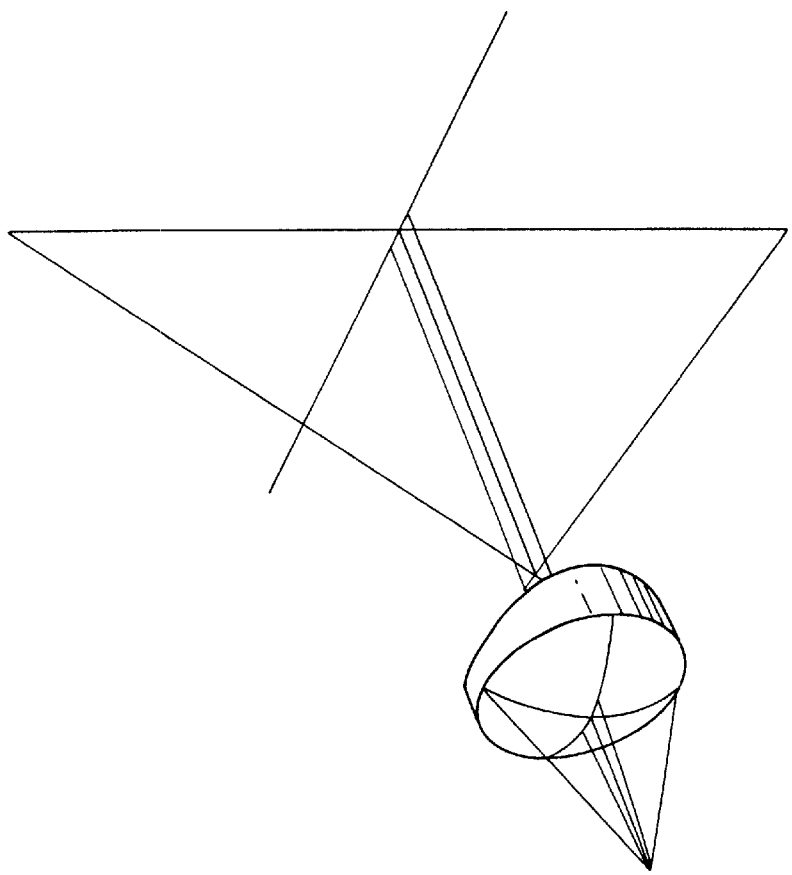
FIG. 7 is a perspective view of a laser line generator system of a third embodiment of the present invention.

According to the third and fourth embodiments of the present invention, the first surface 12 of this lens element 10 is a rotationally symmetric asphere. This first surface 12 of the lens element 10 faces the laser diode 11 and collimates the divergent laser beam provided by the laser diode. The second surface 14 of the lens element 10 has cylindrical optical power. It has a radius of curvature (in one plane) that is either circular or aspheric. This second surface 14 spreads the laser light into a line. Such lens elements 10 are illustrated in FIGS. 7 and 8 and their specific parameters are provided in Table 3 and 4. More specifically, the first surface 12 of the lens elements 10 of the third and fourth embodiments provides a large amount of positive optical power and thus, has a strong convex curvature in both X-Z and Y-Z planes. This surface 12 is located very close to the laser diode 11, with the laser diode 11 located approximately at the focal point of the first surface. The second surface 14 may have either a positive or a negative cylindrical optical power. The cylindrical optical power is defined as optical power in only one direction (i.e., in either X-Z or Y-Z plane). If the optical power is negative, the second surface 14 diverges the laser beam in the direction of its power, stretching the beam into a laser line. This is shown in FIG. 7. If the optical power is positive, the second surface 14 converges the laser beam in the direction of its power toward the optical axis. It is preferred that the slow divergence direction of the laser beam produced by a laser diode be perpendicular to the direction of optical power of the cylindrical surface. This orientation would produce the narrowest possible laser line. After the laser beam crosses the optical axis, the laser beam diverges and spreads out, forming a line. This is shown in FIG. 8. The third and the fourth embodiments are not as preferable as the first and the second embodiments because an optical power is wasted by collimating and then re-diverging the laser beam in one direction. Thus, both surfaces 12 and 14 are relatively strong. Because both surfaces of the lens element 10 of the third and fourth embodiments are strong, such lens elements have greater manufacturing sensitivity than the lens elements of the first and second embodiments.

TABLE 3

| Surface # | Radius | Thickness | Material |
|---|---|---|---|
| OBJ | Infinity | 3.7892 | |
| STO | Infinity | 0.0000 | Air |
| 2 | 2.20138 | 1.0000 | Lexan |
| | K = −2.499420 | | |
| 3 | RDY = 3.18000 | 10.0000 | |
| | RDX = Infinity | | |
| IMG | Infinity | 0.0000 | |

| Specification Data | | Infinite Conjugates | | At Used Conjugates | |
|---|---|---|---|---|---|
| NAO | 0.40350 | EFL | 8.9515 | | |
| DIM | MM | BFL | −2.5428 | FNO | −1.7900 |
| WL | 650.00 | FFL | −9.9859 | OBJ DIS | 3.7892 |
| | | FNO | 2.6785 | | |

| Pupil | Diameter | Thickness |
|---|---|---|
| Entrance | 3.3420 | 0.0000 |
| Exit | 2.9958 | −10.5670 |

TABLE 4

| Surface # | Radius | Thickness | Material |
|---|---|---|---|
| OBJ | Infinity | 3.7892 | |
| STO | Infinity | 0.0000 | Air |
| 2 | 2.20138 | 2.0000 | Lexan |
| | K = −2.499420 | | |
| 3 | RDY = −3.18000 | 10.0000 | |
| | RDX = Infinity | | |
| IMG | Infinity | 0.0000 | |

| Specification Data | | Infinite Conjugates | | At Used Conjugates | |
|---|---|---|---|---|---|
| NAO | 0.40350 | EFL | 2.5933 | | |
| DIM | MM | BFL | −8.2725 | FNO | 1.7900 |
| WL | 650.00 | FFL | −1.9939 | OBJ DIS | 3.7892 |
| | | FNO | 0.7760 | | |

| Pupil | Diameter | Thickness |
|---|---|---|
| Entrance | 3.3420 | 0.0000 |
| Exit | 4.3466 | −11.6453 |

| PARTS LIST | |
|---|---|
| 1 | laser diode |
| 3 | collimator lens |
| 5 | cylinder lens |
| 7 | laser line |
| 10 | lens element |
| 11 | laser diode |
| 12 | first surface |
| 13 | radius of curvature |
| 13' | center of curvature |
| 14 | second surface |

What is claimed is:

1. A laser line generator system comprising
   a laser source providing a diverging laser beam;

a single lens element intersecting said diverging laser beam, said single lens element having a negative optical power in one cross section and a positive optical power in another cross section, said single lens element shaping said diverging laser beam to provide a laser line at an object surface.

2. A laser line generator system according to claim 1, wherein said laser source is a laser diode providing a laser beam that diverges by different amounts in two orthogonal cross sections and said single lens element is oriented such that said positive optical power corresponds to a smaller laser beam divergence cross section and said negative power corresponds to a larger beam divergence cross section.

3. A laser line generator system according to claim 2, wherein said lens element has a first surface which is concave about a center of curvature in at least one cross section, and, in said one cross section, said laser diode being located at said center of curvature of said first surface.

4. A laser line generator system according to claim 2, wherein said lens element has a first surface that is adjacent to said laser diode, said first surface being a toroidal surface.

5. A laser line generator system according to claim 4, wherein said toroidal surface is concave in one cross section and is convex in a perpendicular cross section.

6. A laser line generator system according to claim 4, wherein said lens element has a second surface that is plano.

7. A laser line generator system according to claim 1, wherein said lens element has two surfaces, at least one of which is aspherical.

8. A laser line generator system according to claim 4, wherein said lens element has two surfaces, at least one of which is aspherical in at least one cross section.

9. A laser line generator system comprising
a laser source providing a diverging laser beam;
a single lens element intersecting said diverging laser beam, said single lens element having a first surface with positive optical power in at least one cross section, said first surface being adjacent to said laser source, and a second surface with optical power only in one direction.

10. A laser line generator system according to claim 9, wherein said optical power of said second surface is positive.

11. A laser line generator system according to claim 9, wherein said optical power of said second surface is negative.

12. A laser line generator according to claim 9, wherein at least one of said first and second surfaces is aspherical in at least one cross section.

13. A laser line generator according to claim 9, wherein said first surface has positive optical power in two perpendicular cross sections.

14. A laser line generator according to claim 13, wherein said second surface is a cylindrical surface.

15. A lens element comprising:
a first optical surface, said first surface being concave in one cross section and convex in a perpendicular cross section; and a second optical surface located opposite of said first optical surface, said first surface and said second surface, in combination, providing said lens element with different amounts of optical power in two orthogonal directions.

16. A lens element according to claim 15, wherein said second surface is piano.

17. A lens element according to claim 15, wherein said second surface is concave.

18. A lens element according to claim 15 wherein said second surface is convex.

19. A lens element according to claim 15, wherein one of said surfaces is aspheric in at least one cross section.

20. A lens element according to claim 15, wherein said first lens element is larger in one cross section than in a perpendicular cross section.

21. A lens element comprising:
a first optical surface, said first surface being concave in one cross section and convex in a perpendicular cross section; and a second optical surface located opposite of said first optical surface, said first surface and said second surface, in combination, providing said lens element with different amounts of optical power in two orthogonal directions, wherein the lens element has the following parameters:

| Surface | Radius | Thickness | Material |
|---|---|---|---|
| OBJ | Infinity | 3.300 | |
| 1 | RDY = −3.30000 | 1.000 | SF5 Schott |
| | RDX = 2.20138 | | |
| | K = −2.779168 | | |
| 2, STOP | Infinity | 10.000 | Air |

22. A lens element comprising:
a first optical surface, said first surface being concave in one cross section and convex in a perpendicular cross section; and a second optical surface located opposite of said first optical surface, said first surface and said second surface, in combination, providing said lens element with different amounts of optical power in two orthogonal directions, wherein the lens element has the following parameters:

| Surface # | Radius | Thickness | Material |
|---|---|---|---|
| OBJ | Infinity | 3.7892 | |
| 1 | RDY = −3.78917 | 1.0000 | Lexan |
| | RDX = 2.20138 | | |
| | K = 2.499420 | | |
| 2, STOP | Infinity | 10.0000 | Air |

* * * * *